(12) United States Patent
Ichimura et al.

(10) Patent No.: US 7,574,046 B2
(45) Date of Patent: Aug. 11, 2009

(54) OPTIMIZED LIGHTING METHOD FOR SLIDER SERIAL READING USING CLASS VARIANCE

(75) Inventors: Yohtaroh Ichimura, Kanagawa (JP);
Shinichi Iwasa, Kanagawa (JP);
Takayuki Erikawa, Kanagawa (JP);
Yukihiro Nakamura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 709 days.

(21) Appl. No.: 11/303,784

(22) Filed: Dec. 15, 2005

(65) Prior Publication Data
US 2006/0126934 A1     Jun. 15, 2006

(30) Foreign Application Priority Data
Dec. 15, 2004     (JP)     ............................. 2004-362828

(51) Int. Cl.
*G06K 9/00*     (2006.01)
(52) U.S. Cl. ...................................... 382/181
(58) Field of Classification Search ................ None
See application file for complete search history.

(56) References Cited

U.S. PATENT DOCUMENTS

| | | | |
|---|---|---|---|
| 5,450,291 A | * | 9/1995 | Kumagai ........................ 362/3 |
| 5,768,407 A | * | 6/1998 | Shen et al. ................... 382/133 |
| 5,768,412 A | * | 6/1998 | Mitsuyama et al. ......... 382/173 |
| 5,956,421 A | * | 9/1999 | Tanaka et al. ................ 382/172 |
| 6,721,443 B1 | | 4/2004 | Nakata |

FOREIGN PATENT DOCUMENTS

| | | |
|---|---|---|
| JP | 09-269972 | 10/1997 |
| JP | 2000-269165 | 9/2000 |
| JP | 2003-037151 | 2/2003 |
| JP | 2003-177013 | 6/2003 |

* cited by examiner

*Primary Examiner*—Matthew C Bella
*Assistant Examiner*—Yuzhen Ge
(74) *Attorney, Agent, or Firm*—Townsend and Townsend and Crew LLP; Rambod Nader

(57) ABSTRACT

Embodiments of the invention provide a method for setting a light source parameter in order to recognize an identification mark on an object surface. In one embodiment, a grayscale image is generated by setting the light volume of the light source to a given value. Plural thresholds each for binarizing the grayscale image in density are set. The inter-class variance values to be produced respectively according to the thresholds are calculated and the largest inter-class variance value is selected as the peak inter-class variance value from the inter-class variance values calculated. The light volume is changed to a plurality of different values. Peak inter-class variance values are obtained respectively for the values and the largest peak inter-class variance value is selected as the maximum inter-class variance value from the peak inter-class variance values obtained. The object surface is irradiated by the light source whose light volume is set to a value which would give the maximum inter-class variance value.

20 Claims, 9 Drawing Sheets

(A)

(B)

(C)

(D)

(A)

(B)

(C)

(D)

(E)

(F)

(G)

(H)

(I)

(J)

OPTIMIZED LIGHTING METHOD FOR SLIDER SERIAL READING USING CLASS VARIANCE

CROSS-REFERENCES TO RELATED APPLICATIONS

This application claims priority from Japanese Patent Application No. JP2004-362828, filed Dec. 15, 2004, the entire disclosure of which is incorporated herein by reference.

BACKGROUND OF THE INVENTION

The present invention relates to a technique for irradiating an object surface by a light source and recognizing an identification mark from the reflection therefrom. More specifically, the invention relates to a technique which raises the identification mark recognition accuracy by optimizing parameters of the light source so as to generate a good contrast image.

Magnetic disk drives comprise a head gimbal assembly (hereinafter, denoted as an HGA) which has a head/slider attached to a suspension assembly. A serial number composed of a combination of letters, numbers and the like is formed on the head/slider. This serial number is used to identify the slider wafer or the HGA, facilitating production management and failure analysis. To read a serial number marked on a surface of a head/slider, it is necessary to supply a good contrast image to a pattern recognition device.

Identifiers such as serial numbers can be recognized using grayscale images which have only brightness information. Therefore, a light source such as a halogen lamp or an LED irradiates the head/slider to generate a grayscale image of the serial number with a background from the reflection of the light incident on the head/slider. The generated grayscale image is sent to a pattern recognition device. In the pattern recognition device, the serial number in the grayscale image is compared with preliminarily prepared standard patterns for recognition by template matching using the normalized correlation method.

In the normalized correlation method, similarity between input image $f(x)$ and standard image $g(x)$ is scored according to Equation 1 where $fa$ is the average of the input image and $ga$ is the average of the standard image. The grayscale image is characterized by absolute density values and contrasts. Since the density value of each pixel is normalized by the average of all pixels in this normalized correlation method, it is not necessary to consider the absolute density values of the input image for raising recognition ratio. In raising the recognition ratio, attention can be focused on contrasts only. Symbol $a$ in Equation 1 corresponds to the distance by which the standard pattern is shifted for template matching.

EQUATION 1

$$C = \Sigma\{f(x-a)-fa\}\{g(x)-ga\}/[\Sigma\{f(x-a)-fa\}^2]^{1/2}/[\Sigma\{g(x)-ga\}^2]^{1/2} \quad \text{(Equation 1)}$$

Patent Document 1 (Japanese Patent Laid-Open No. 2001-118232) has disclosed a technique for identifying an identification mark inscribed on a slider by laser irradiation or the like. In this technique, fully incident illumination is employed to raise the recognition ratio by improving the contrasts of the video signal which is supplied to an image processing device. Disclosed in Patent Document 2 (Japanese Patent Laid-Open No. 2003-37151) is a technique for a mark reader device which reads a mark formed on a semiconductor wafer or metal surface by laser beam irradiation. In the abstract of this document, it is described that if the illumination angle is within a certain range, it is possible to enlarge the brightness difference or contrast values and raise the recognition score (correlation coefficient used in identifying each character) by adjusting the volume of illumination light even if the dot mark is very small and varies in height and size. In Patent Document 3 (Japanese Patent Laid-Open No. 9-269972), a technique is disclosed which is applicable to a production line. This technique concerns the recognition of a pattern such as characters. In this technique, the threshold for separating the pattern from the background is determined so as to maximize the inter-class variance.

In a recognition system where an identifier marked on an object surface of a head/slider is recognized by pattern matching according to a grayscale image of the object surface which is generated from the reflection of illumination light incident on the object surface, a good contrast grayscale image must be generated to raise the recognition accuracy. The parameters having influence on the contrast of the grayscale image include the light source's light volume, wavelength, and illumination angle with respect to the object surface. For 256-grayscales, binary images consisting of density 0 (black) and density 255 (white) pixels have the highest contrast. In the case of an ordinary grayscale image whose each pixel can have any of various intermediate density values, the grayscale image is considered as a good contrast image if the 0 to 255 dynamic range is fully used by the pixel histogram.

On the other hand, in the case of a grayscale image for identifier recognition, since it is important to clearly separate the identifier from the background, the grayscale image may be considered as a good contrast image if the density peak for the identifier is sufficiently distant in the histogram from the density peak for the background. A serial number, which is formed on a mirror-like head/slider surface by laser beam irradiation, is dented from the head/slider surface and has considerable irregularities since the dented surface is melted due to the heat of the laser beam. A grayscale image is generated from the reflection of irradiation light on both the background or the mirror-like head/slider surface and the dented serial number grooves. Therefore, pixels at a position associated with the background become whiter, that is, their densities are raised since the background causes regular reflection. Likewise, pixels at a position associated with the serial number regions become blacker or their densities are lowered since the serial number grooves cause diffuse reflection.

Well-known differentiation filters, such as Sobel filter, can be used in order to adjust the light volume so as to secure a good contrast between the background and the serial number in a grayscale image of the head/slider's object surface. The differentiation filter removes low frequency components from a grayscale image and is composed of, for example, 3×3 operators. FIG. 1 shows a view for explaining a state where images serial number-marked on a slider surface are generated using Sobel filters. Shown in FIG. 1(A) is a 256-grayscale image obtained by digitalizing the reflection of illumination light incident on the object surface of the serial number-marked head/slider. The central rectangular white region corresponds to the object surface, a side surface of the head/slider on which the serial number is marked. The surrounding black region around the rectangular white region corresponds to a field outside the side surface of the head/slider and therefore receives no reflection although it is covered by the image pickup unit. The background, that is, the object surface of the head/slider except for the serial number grooves, is almost white due to a great amount of light reflected regularly therefrom and received by the image pickup unit. On the other hand, the serial number grooves are somewhat black since the reflection received by the image pickup unit is insufficient due to diffuse reflection of the incident light therefrom. Note that since the images in FIG. 1 are picked up via a prism, the serial number is turned over.

Shown in FIG. 1(B) is an image obtained by processing the image of FIG. 1(A) by a Sobel filter. The output image from the Sobel filter is characterized in that the density-constant white region within the background and somewhat black regions within the serial number grooves are darkened and blackened since the pixels therein are lowered in density. On the other hand, the boundaries between the background and the serial number are highlighted or whitened since the pixels therein are raised in density. Since the total density sum of the density values of all pixels in the output image is equal to the density sum of the pixels in the boundaries between the background and the serial number, the total density sum indicates how the serial number is separated from the background. Therefore, this total density sum may be used as an index of contrast in optimizing the light volume.

Shown in FIG. 1(C) is an input image generated with such a volume of light as to maximize the total density sum of the output image of the Sobel filter. Shown in FIG. 1(D) is an output image generated from the input image of FIG. 1(C). In the image of FIG. 1(C), the white area indicative of the pixels corresponding to the background include low density black ones. This is because the head/slider surface is not uniform in reflectivity with respect to the incident light or the background is not uniform in brightness and therefore the pixels at an area corresponding to the background which is obtained from the reflected light are not constant in density.

Processing the input image of FIG. 1(C) by the Sobel filter results in the image of FIG. 1(D). In the output image of FIG. 1(D), density-varying spots within an area corresponding to the background are highlighted or raised in density, which greatly contributes to the total density sum. If the light volume is determined based on the image of FIG. 1(D), the grayscale image of FIG. 1(C) is sent to a pattern recognition device. In this case, since the serial number is not clearly separated in brightness from the background due to high density spots included in the background, the recognition ratio cannot be raised satisfactorily. Accordingly, it is demanded to develop a method capable of optimizing the light source's parameters which have influence on the brightness.

BRIEF SUMMARY OF THE INVENTION

It is a feature of the present invention to provide a method for setting a light source's parameter in order to recognize an identifier on an object surface. In addition, it is a feature of the present invention to provide a method for optimizing the light source's parameter in order to recognize the identifier.

The principle of the present invention lies in using the value of inter-class variance in setting a parameter of a light source for recognizing an identifier on an object surface. A highly recognizable good contrast image can be picked up if the parameter is set to such a value as to maximize the value of inter-class variance according to the result of analyzing the images which are picked up by setting the light source parameter to different values.

According to an aspect of the present invention, there is provided a method for setting a parameter of a light source which applies an image pickup beam to an object surface including a background and an identification mark, said method comprising: a parameter setting step of setting a parameter of the light source which has influence on the brightness of the object surface, to a predetermined value; a grayscale image generating step of generating a grayscale image from the reflection of incident light which is applied to the object surface from the light source whose parameter has been set to the predetermined value; a peak inter-class variance value selecting step of setting plural thresholds each for binarizing the grayscale image in density, calculating inter-class variance values to be produced respectively according to the plural thresholds, and selecting the largest inter-class variance value as the peak inter-class variance value from the inter-class variance values calculated; a maximum inter-class variance value selecting step of changing the light source parameter to a plurality of different values, obtaining peak inter-class variance values respectively for the plurality of different values, and selecting the largest peak inter-class variance value as the maximum inter-class variance value from the peak inter-class variance values obtained; and a step of setting the light source parameter to a value which would give the maximum inter-class variance value.

There are a plurality of light source parameters which have influence on the brightness of an object surface. These light source parameters include light volume, wavelength, and illumination angle. The present invention can be applied to the setting of any controllable parameter for generating an optimum contrast pickup image. If the light source has a plurality of controllable parameters, it is possible to optimize all of them. For example, with a first parameter fixed, a second parameter is at first optimized. Then, the first parameter is optimized with the second parameter fixed to the optimum value. This can optimize both first and second parameters.

A grayscale image is generated by converting analog brightness quantities to digital density values. The number N of grayscales is arbitrary. When searching for the peak inter-class variance value for a given parameter value, the threshold is changed fully from 0 to $N-1$ or 1 to $N-2$. Alternately, if the threshold to produce the peak inter-class variance value is roughly known, the threshold may be changed within a range including the estimated value. The method of the present invention can be used suitably to recognize an identifier which is formed by laser beam irradiation on such a mirror-like flat surface as a head/slider surface which varies in reflectivity depending on the place.

The present invention provides a method for setting a light source's parameter in order to recognize an identifier on an object surface. In addition, the present invention provides a method for optimizing the light source's parameter in order to recognize the identifier.

DETAILED DESCRIPTION OF THE INVENTION

Head/Slider and Serial Number

Figure 1:
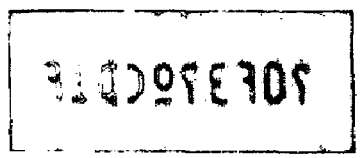
FIG. 1 shows a view for explaining a state where images serial number-marked on a slider surface are generated using Sobel filters.
Figure 1:
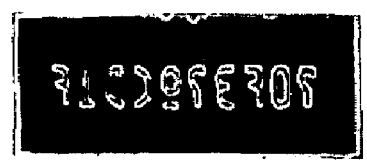
Figure 1:
Figure 1:
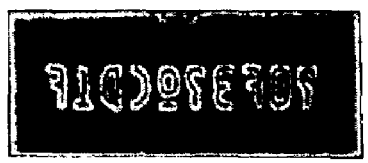
Figure 2:
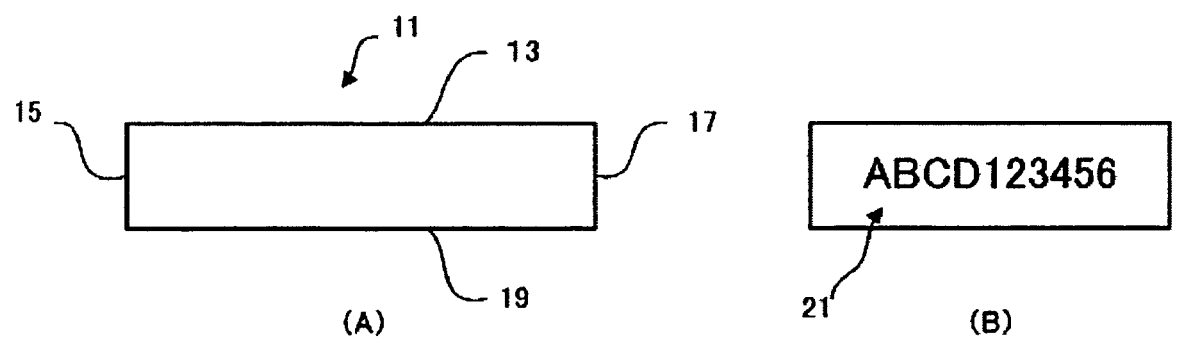
FIG. 2 shows a view for explaining a serial number which is marked on a head/slider by using a laser beam.
Figure 2:
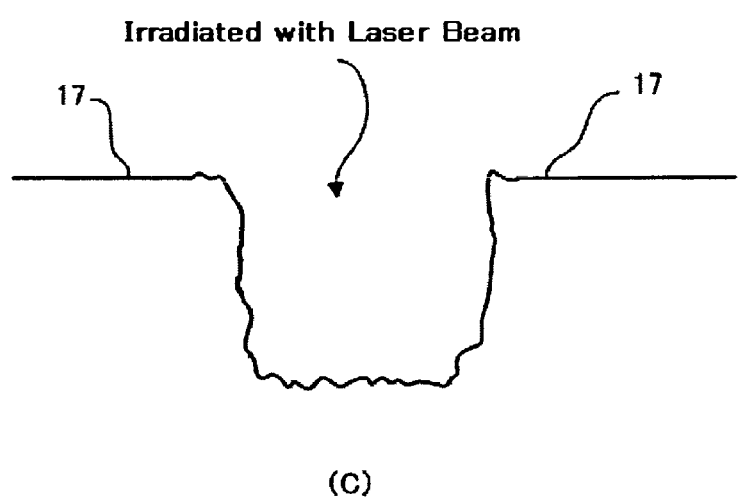

A head/slider is formed from a ceramic AlTiC substrate composed of aluminum oxide and titanium carbide. A thin-film write head and GMR read head are formed on the substrate by depositing insulating layers, magnetic layers, GMR layers and others thereon. FIG. 2 shows the outer shape of the head/slider 11. The head/slider 11 shown as an example is classified in size as what is generally called a pico slider. It is a rectangular solid having a length of 1.25 mm in the air flow direction on the magnetic disk, a width of 1 mm and a height of 0.3 mm. The present invention is also applicable to larger and smaller sliders including femto sliders.

FIG. 2(A) is a side view of the head/slier 11. A top surface 13 is an attachment surface associated with a suspension assembly. On a left side surface 15, slider pads are formed as the head's external terminals. A bottom surface 19 is an air bearing surface (hereinafter referred to as the ABS) which faces the magnetic disk when the HGA is set as an assembly in the magnetic disk. A right side surface 17 is a surface on which a serial number 21 is formed (hereinafter referred to as the object surface). An object surface 17 exists on the so-called leading edge at which an air flow produced on the magnetic disk enters between the ABS and the magnetic disk surface.

FIG. 2(B) is a front view of the object surface 17. A serial number 21 is formed thereon as a 10-digit identifier by laser beam irradiation. In this embodiment, each digit of the serial number 21 is one of a total of 18 different symbols—sixteen hexadecimal alphanumeric characters plus 0 under bar and 1 under bar.

FIG. 2(C) is an enlarged view of a part of the object surface 17 on which the serial number is formed by laser beam irradiation. Although the object surface 17 is a mirror-finished flat surface, portions irradiated with a laser beam are dented from the flat surface. The inner surface of each dent has small irregularities. Thus, although the incident light ray from the light source is regularly reflected by the object surface 17, the reflection from the serial number portions is diffused.

Light Volume Determining Method

Figure 3:
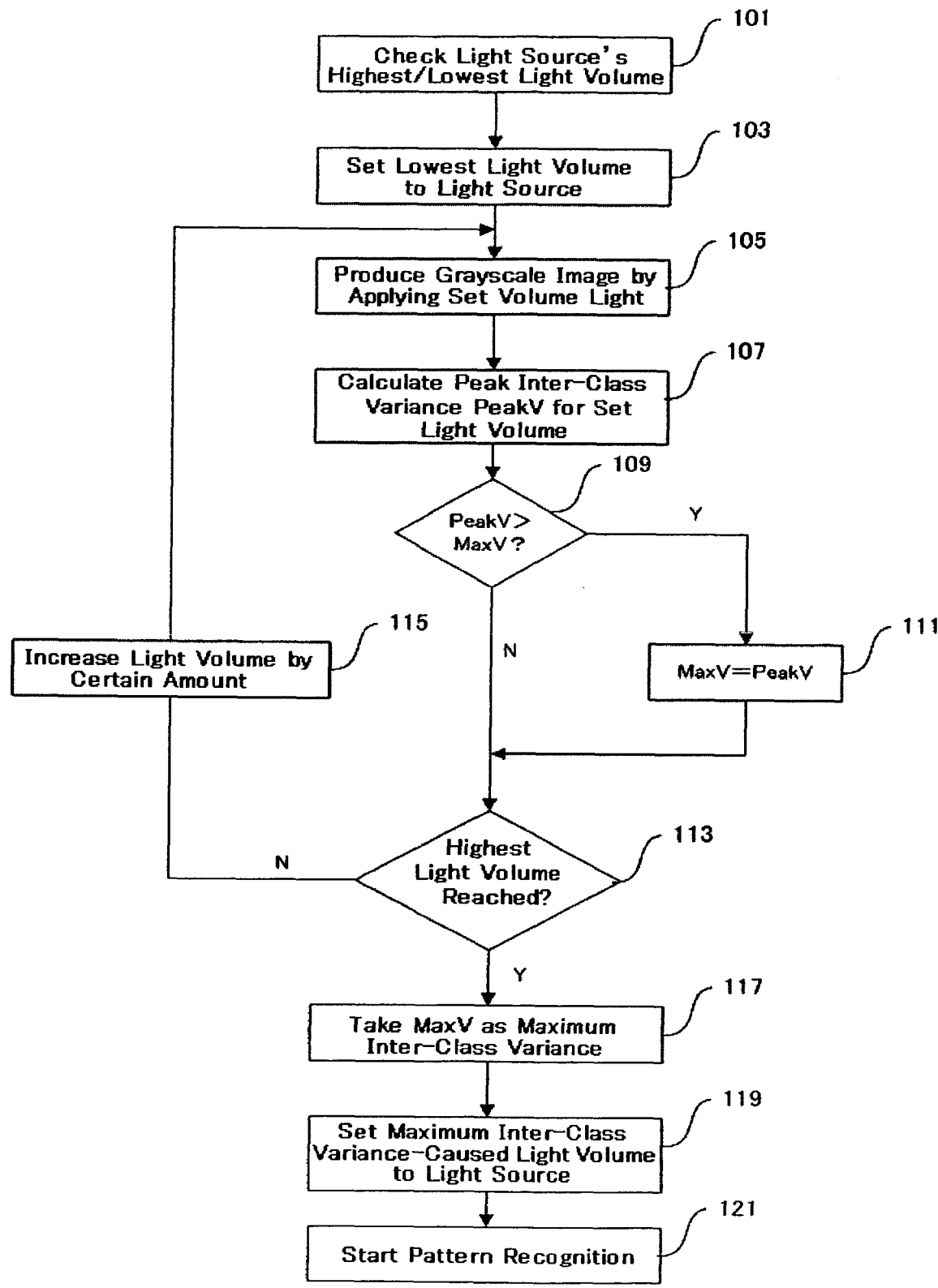
FIG. 3 is a flowchart showing a procedure for setting the volume of light to produce a grayscale image of an identifier to be recognized according to an embodiment of the present invention.
Figure 4:
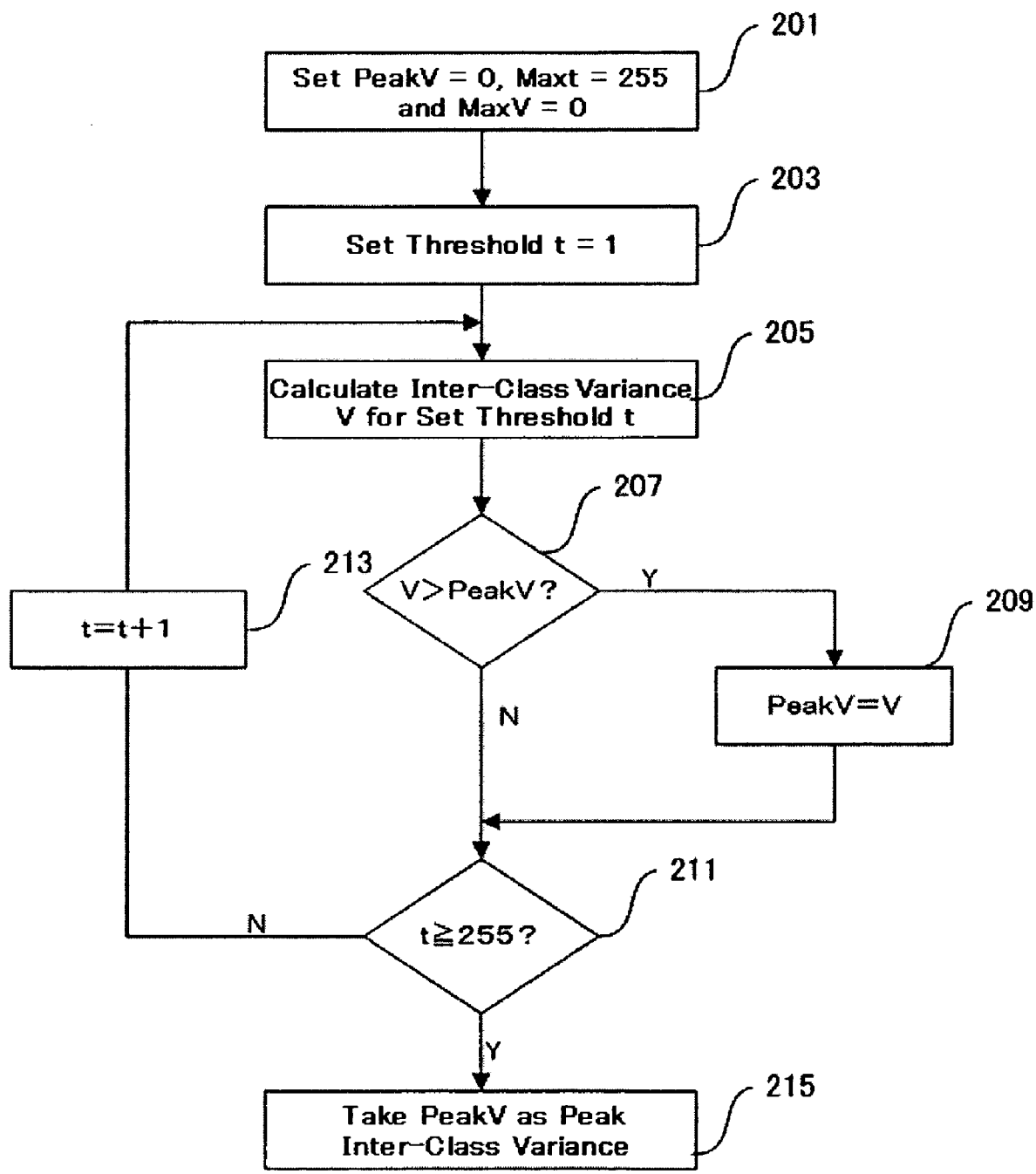
FIG. 4 is a flowchart showing a procedure for calculating the peak value of inter-class variance according to an embodiment of the present invention.
Figure 5:
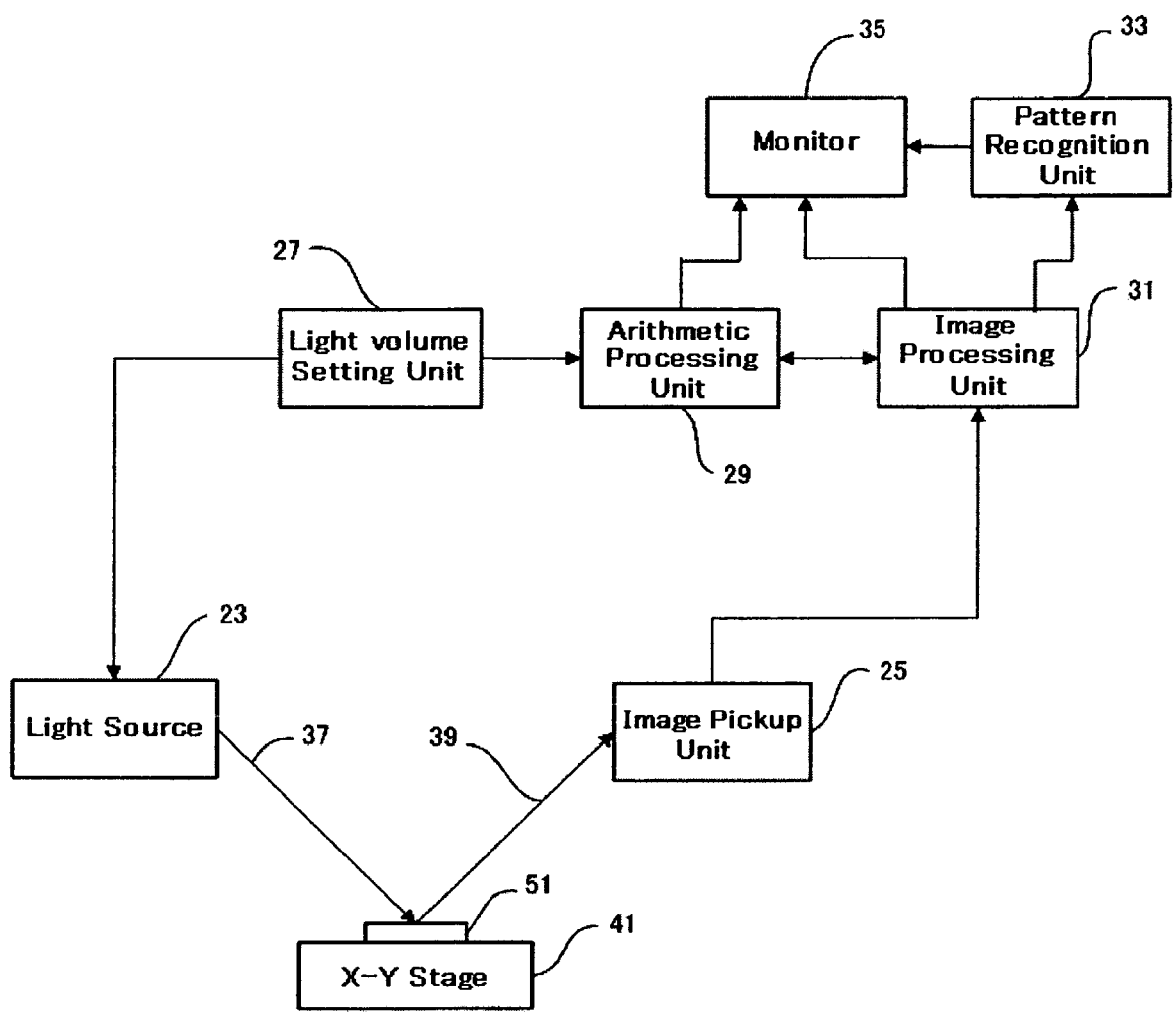
FIG. 5 is a schematic block diagram of an identifier recognition apparatus according to an embodiment of the present invention.

An image of the object surface 17 on the head/slider 11 is picked up by illuminating the object surface 17 with incident light. With reference to FIGS. 3 through 10, the following describes how the intensity of the incident light is determined. FIG. 3 is a general flowchart showing a procedure to optimize the light volume based on the contrast as an index and recognize the identifier. FIG. 5 is a schematic diagram of an identifier reader which comprises an X-Y stage 41, a light source 23, an image pickup unit 25, a light volume setting unit 27, an arithmetic processing unit 29, an image processing unit 31, a monitor 35, and a pattern recognition unit 33. An HGA 51 having a head/slider 11 from which a serial number 21 is to be read out is fixed on the X-Y stage 41 so that it can move in the X and Y directions.

Figure 10:
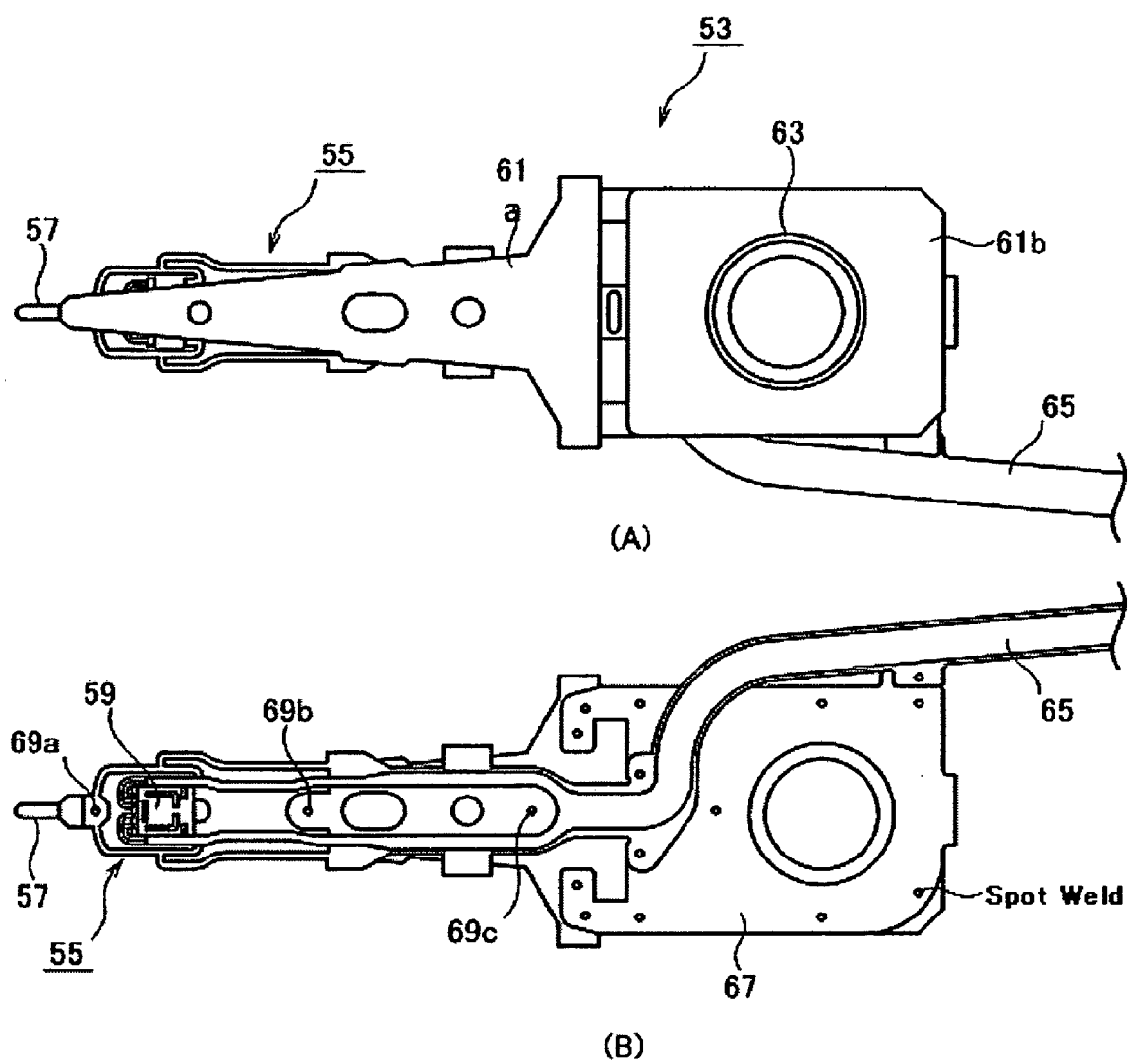
FIG. 10 shows the configuration of an HGA.

FIG. 10 is a plan view of a suspension assembly 53, a component of the HGA 51. The HGA 51 comprises the suspension assembly 53 having the head/slider 11 attached thereon. FIG. 10(A) is an enlarged illustration of the suspension assembly 53 viewed from the load beam side. Likewise, in FIG. 10(B), the suspension assembly 53 is viewed from the head/slider side. The suspension assembly 53 comprises the load beam's fixed section 61b and arm section 61a, a hinge 67, a mount plate 63, a flexure assembly 55, and a wiring trace 65. The flexure assembly 55 has a flexure tongue 59 to which the head/slider 11 is attached. The load beam's arm section 61a has a merge lip 57 formed at the front end. The top surface 13 of the head/slider 11 is bonded to the flexure tongue 59 so that the left side surface 15 faces the merge lip 57.

Turning back to FIG. 5, the HGA 51 is fixed to the X-Y stage so that incident light 37 from the light source 23 can be applied to the object surface 17 of the head/slider 11. Containing a halogen lamp and an optical mechanism to apply parallel light rays to the object surface, the light source 23 is configured so that the light volume can be adjusted by an operation signal from a light volume setting unit 27. The light volume is the total luminous energy irradiated from the light source and corresponds to the luminous flux integrated with time. In addition, the light source 23 is configured so that the incident angle of the light 37 relative to the head/slider 11 can be adjusted.

The light volume setting unit 27 allows the light volume to be set manually. An operation quantity of voltage, current or the like is generated according to the manual setting, and sent to the light source 23 and the arithmetic processing unit 29. Located so as to receive the regular reflection 39 from the object surface, the image pickup unit 25 comprises an optical system, a CCD and an A-D converter. The optical system creates an image of the object surface 17 by receiving the reflection 39 from the object surface 17 and supplies the image to the CCD as optical information. Each unit element of the CCD corresponds to a pixel. It converts the optical signal to an electric signal representing the brightness of each pixel within the field of view. The brightness of each pixel is an analog quantity. The A-D converter converts this analog brightness quantity to a digital 256-grayscale density value through quantization. The number of grayscales may not be limited to 256 and increasing the number of grayscales makes it possible to produce a higher resolution image although this imposes a larger burden on the computer.

Based on the image data or density values sent from the image pickup unit 25, the image processing unit 31 generates output image data for display on the monitor and histograms. In generating output image data in the image processing unit 31, it is possible to apply filtering processing, contrast adjustment, object surface 17 cutout processing, and the like to the input image data.

The monitor 35 displays the output image data generated by the image processing unit 31. The pattern recognition unit 33 includes a memory for storing an input image, a memory for storing the standard pattern of each character which may be used in serial numbers, a template matching section, and a score judgment section. The pattern recognition unit 33 performs template matching by comparing the input image with standard patterns and outputs to the monitor 35 a serial number consisting of patterns which are recognized with scores not lower than the threshold value.

The arithmetic processing unit 29 includes a processor and a memory. Receiving a set light volume value from the light volume setting unit 27 and an image data histogram corresponding to the set light volume from the image processing unit 31, the arithmetic processing unit 29 calculates the peak and maximum inter-class variances. To the monitor 35, the arithmetic processing unit 29 sends the light volume value which causes the maximum inter-class variance.

With reference to FIG. 3, the following describes how the light volume is determined. The X-Y stage 41 on which the HGA 51 is mounted is positioned so that the incident light 37 from the light source 23 is applied to the object surface 17. Although in FIG. 5, the incident light 37 is applied to the object surface 17 at a certain incident angle, the object surface 17 may also be irradiated perpendicularly with the incident light 37. In addition, the light source 23 and the image pickup unit 25 may be positioned instead of adjusting the position of the X-Y stage 41.

In this step, an image in the field of view of the image pickup unit 25 is displayed on the monitor 35. The position of the X-Y stage is determined with reference to the image. In block 101, it is checked whether the light source 23 has a sufficiently large adjustable range of the volume light to search for the optimum light volume. To check the adjustable range, the image on the monitor 35 is used while the light volume is adjusted by the light volume setting unit 27. The lowest light volume in the adjustable range of the light volume must produce an unreadably dark serial number 21 image on the monitor 35. If such a lowest light volume cannot be obtained, it is necessary to darken the room by lowering the room illumination or shading the room.

The highest light volume in the adjustable range of the light volume must be sufficiently large to cause halation at the object surface 17 due to excessive light. With the highest light volume, the serial number displayed in black on the monitor 35 must thus be thinner than actual. If such a highest light volume cannot be obtained, it is necessary to adjust the optical system of the light source 23, adjust the angle of incidence on the object surface 17 and/or adjust the sensitivity of the image pickup unit 25. If such highest and lowest light volumes can be obtained by the light source, the optimum light volume always exists in the adjustable range of the light source, allowing this embodiment to find the optimum light volume.

The procedure shown in FIG. 3 concerns only the light volume although plural parameters of the light source have influence on the contrast of the image picked up. It is assumed that while this procedure is being executed, the wavelength, incidence angle and other parameters of the light source which have influence on the contrast of the picked up image are fixed to certain values predetermined by some methods. From block 103, as detailed below, this procedure applies a visible light ray to the object surface 17 as the incident light 37 from the light source 23, receives the reflection 39 by the image pickup unit 25, and performs calculation in the arithmetic processing unit 29 to determine the optimum light volume.

The light source 23 is configured so that the light volume varies continuously or in steps from the lowest light volume to the highest light volume according to the operation quantity of voltage or current in the light source 23 changed by the light volume setting unit 27. In block 103, the light volume setting unit 27 sets the light volume of the light source 23 to the lowest light volume. In block 105, the set volume of visible light is applied to the object surface 17 and the reflection 39 is received by the image pickup unit 25. The image pickup unit 25 generates a digital grayscale image by converting analog brightness quantities to 256-grayscale digital density values, and sends the grayscale image data to the image processing unit 31. The number of grayscales in the grayscale image may not be limited to 256. Within the spirit of the present invention, the generated grayscale image may have either more or fewer gradations in density.

The image processing unit 31 sends the image data to the monitor 35 to display the image picked up. Further, the image processing unit 31 generates a histogram from the image data and sends it to the arithmetic processing unit 29. This histogram indicates the number of pixels having each of density values 0 through 255. In block 107, the arithmetic processing unit 29 sets a plurality of thresholds to the histogram of the grayscale image, and calculates the inter-class variance for each threshold. Further, the peak inter-class variance is also calculated. With reference to the flowchart of FIG. 4, the following describes how the peak inter-class variance is calculated.

In block 201, the arithmetic processing unit 29 allocates memory areas to PeakV, Maxt, and MaxV. The memory areas PeakV, Maxt, and MaxV store the peak inter-class variance, maximum threshold, and maximum inter-class variance, respectively. Initially, 0, 255, and 0 are written into PeakV, Maxt, and MaxV. Here, the peak inter-class variance means the largest one of the inter-class variances calculated with various thresholds for a specific light volume. As well, the maximum inter-class variance means the largest one of the peak inter-class variances calculated with the respective light volumes between the lowest light volume and the highest light volume.

In block 203, the arithmetic processing unit 29 sets threshold t to the lowest value 1 for the 256-grayscale histogram. Threshold t is used for binary density conversion of the image data. Each pixel has one of density values 0 (black) through 255 (white) and contributes to the number of pixels of that grayscale in the histogram. Any pixel is classified into either a group of pixels (class 1) with density values smaller than threshold 1 or a group of pixels (class 2) with density values not smaller than threshold 1. To produce a binary image, the former group of pixels are converted to 0 in density while the latter group of pixels are converted to 255 although it is not necessary to actually produce a binary image in this embodiment. To calculate the inter-class variances using two classes, the present embodiment sets the thresholds from the lowest 1 to the highest 255. With the threshold-based sorting rule, if pixels having the same density as the threshold are included in a group having a small density value, the lowest and highest thresholds are set to 0 and 254, respectively.

In block 205, the arithmetic processing unit 29 calculates the inter-class variance V between two classes, namely, class 1 and class 2 which are created based on the set threshold 1. When the threshold is set to 1, the pixels having density value 0 are sorted into the lower density class 1 while the pixels having density values 1 through 255 are sorted into the higher density class 2. The inter-class variance V is given by Equation 2:

EQUATION 2

$$V = \omega_1 \omega_2 (M_1 - M_2)^2 \qquad \text{(Equation 2)}$$

Where, $\omega_1$ and $M_1$ are the number and mean density value of pixels contained in class 1 while $\omega_2$ and $M_2$ are the number and mean density value of pixels contained in class 2.

In block 207, the arithmetic processing unit 29 compares the calculated inter-class variance V with the value in the memory area PeakV. If the calculated inter-class variance V is larger than the value in the memory area PeakV, the value in the memory area PeakV is replaced by the calculated inter-class variance V in block 211 before processing goes to block 211. If the calculated inter-class variance V is equal to or smaller than the value in the memory area PeakV, the value in the memory area PeakV is not replaced before processing goes to block 211.

In block 211, the arithmetic processing unit 29 judges whether the threshold t set in block 205 is equal to or larger than 255. If smaller than 255, the arithmetic processing unit 29 increments the threshold by 1 in block 213 and loops back to block 205. Although the threshold is incremented by 1 at a time in this embodiment, this incremental width does not have to be limited to 1. Block 213 may be modified so as to increment the threshold by 2 or more at a time. This lightens the computation burden although the accuracy deteriorates. The arithmetic processing unit 29 performs a loop of calculation blocks 205 through 211 N times to calculate the inter-class variance V for each of N thresholds t between 1 and 255. As a result, the peak inter-class variance calculated for the set light volume is stored in the memory area PeakV.

Figure 6:
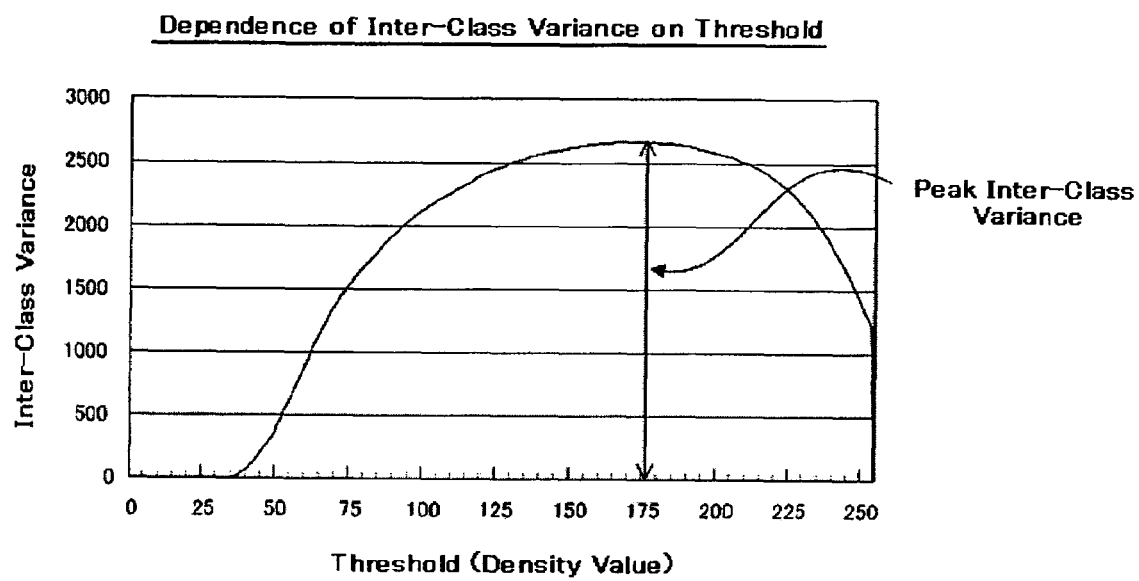
FIG. 6 shows a distribution of inter-class variance values.

If it is judged in block 211 that the threshold t has reached 255, processing goes to block 215 where the arithmetic processing unit 29 takes the PeakV value as the peak inter-class variance for the light volume set in block 105 shown in FIG. 3. FIG. 6 shows a distribution of inter-class variances calculated according to the procedure of FIG. 4 regarding a grayscale image generated by the reflection which was obtained by applying a certain volume of visible light to the object surface. As the density threshold is gradually increased from 1 to 255, the inter-class variance calculated for the threshold changes as shown in FIG. 4. At a density value of 172, the largest inter-class variance is obtained which corresponds to the peak inter-class variance.

Referring to block 109 of FIG. 3, the arithmetic processing unit 29 compares the value in the memory area PeakV with the value in the memory area MaxV. If the value in the memory area PeakV is larger than the value in the memory area MaxV, the arithmetic processing unit 29 goes to block 111. The arithmetic processing unit 29 replaces the value in the memory area MaxV by the value in the memory area PeakV and the process then goes to block 113. If the value in the memory area PeakV is equal to or smaller than the value in the memory area MaxV, the arithmetic processing unit 29 goes to block 113 without replacing the value in the memory area MaxV.

In block 113, the arithmetic processing unit 29 judges whether the light volume set in block 105 has reached the highest light volume. If not, the arithmetic processing unit 29 increases the light volume by a predetermined value in block 115 and the process then goes back to block 105. The light volume may be changed either digitally in steps or continuously in analog style. The arithmetic processing unit 29 performs a loop of calculation blocks 105 through 113 each time the light volume is increased between the lowest light volume and the highest light volume. As a result, the largest one of the peak inter-class variances calculated for the respective light volumes is left in the memory area Max.

If it is judged in block 113 that the light volume has reached the highest light volume, the arithmetic processing unit 29 goes to block 117 to take the value in the memory area MaxV as the maximum inter-class variance and displays on the monitor 35 the operation quantity which was set by the light volume setting unit 27 when the corresponding image was produced. In block 119, the operation quantity is set by the light volume setting unit 27 to maximize the inter-class variance by optimizing the light volume of the light source 23. In block 121, the light source 23 applies the optimum volume of light to the object surface, so that the image pickup unit 25 and the image processing unit 31 produce a grayscale image and sends it to the pattern recognition unit 33. In turn, the pattern recognition unit 33 recognizes the serial number by template matching.

The following describes the meaning of using inter-class variance values in this embodiment to optimize the light volume for producing a good contrast pick up image. To recognize an identifier such as a serial number marked on a mirror-finished background, the identifier must be separated accurately from the background based on the optical information. Separation of an identifier in a 256-grayscale image from the background can be done by binarizing the density of each pixel in the grayscale image. If the pixels are sorted by density into two classes based on a given threshold, the value of inter-class variance serves as a general index of how the pixels contained in one class differ in density from the pixels contained in the other class. Thus, if the binarization is made based on such a threshold as to maximize the value of inter-class variance, the identifier can be separated accurately from the background since this decreases the pixels which turn white although they correspond to parts of the identifier or black although they correspond to parts of the background.

Figure 7:
FIG. 7 shows ten 256-grayscale images of the head/slider produced by applying ten different volumes of light respectively thereto.
Figure 7:
Figure 7:
Figure 7:
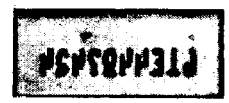
Figure 7:
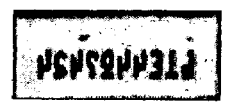
Figure 7:
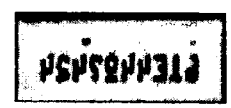
Figure 7:
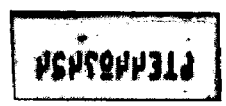
Figure 7:
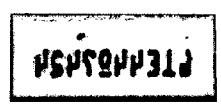
Figure 7:
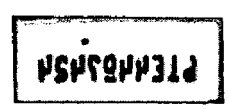
Figure 7:
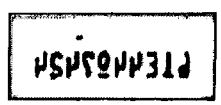
Figure 8:
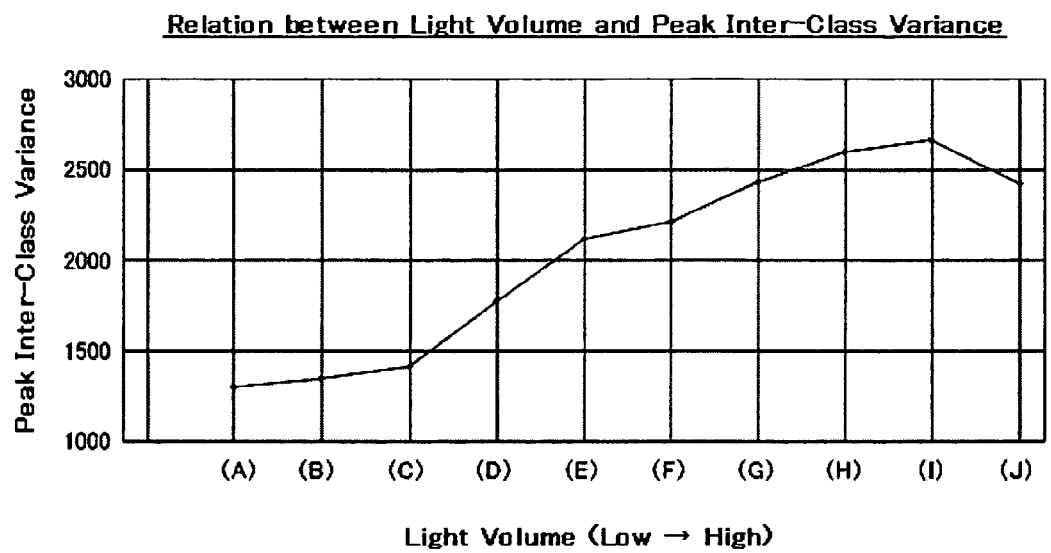
FIG. 8 is a graph showing the peak inter-class variance values calculated respectively from the grayscale image in FIGS. 7(a) through (j).
Figure 9:
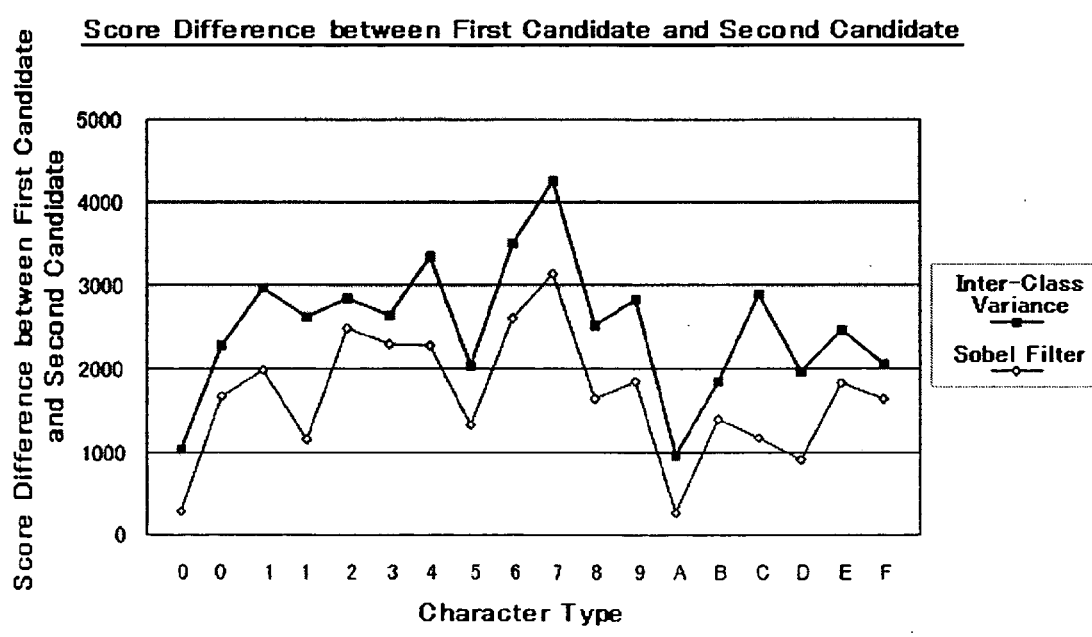
FIG. 9 is a graph showing the difference of scores which were given to the first and second candidates determined from grayscale images which were produced by a Sobel filter-used method and by the method of the present invention, respectively.

Thus, the value of inter-class variance can be used as an index when a grayscale image is binarized to the highest contrast image consisting of density 0 pixels and density 255 pixels. From a different point of view, this also indicates that the value of inter-class variance can be used as a proper index when the light volume is determined so as to produce a good contrast grayscale image. With reference to FIGS. 7 through 9, this is described below. FIG. 7 shows ten 256-grayscale images of the head/slider 11 obtained by applying ten different volumes of light to the head/slider 11. FIG. 7(A) is a grayscale image picked up by applying the lowest volume of light while a grayscale image in FIG. 7(J) which shows halation was picked up with the highest volume of light. When the images are picked up in FIGS. 7(B) through 7(I), the light volume was increased in this order. As the light volume was increased, the background gradually turned whiter.

FIG. 8 is a graph showing the peak inter-class variance values calculated respectively from the grayscale image in FIGS. 7(A) through (J). In FIG. 8, the grayscale image of FIG. 7(I) has the largest peak inter-class variance value which corresponds to the maximum inter-class variance value. In the case of the image of FIG. 7(J), the serial number is thinned due to the excessively large light volume and its peak inter-class variance value is smaller than that of the image in FIG. 7(I). Referring to FIGS. 7 and 8, grayscale image produced by irradiating the object surface 17 with such volumes of light as to give larger inter-class variance values are visually better in contrast. This supports the validity of the maximum inter-class variance value as an index in determining the light volume.

FIG. 9 is a graph showing the difference of scores which were given to the first and second candidates determined for each character as a result of template matching recognition of the serial number. One curve is plotted for a 256-grayscale image generated by applying such a volume of light as to give the maximum inter-class variance value as in this embodiment while the other curve concerns another 256-grayscale image generated by applying a different volume of light determined as optimum by Sobel filter-based search. In the template matching, it is judged which of the prepared eighteen standard patterns most resembles each character of the serial number extracted from the grayscale image according to their normalized correlation scores given by Equation 1.

Therefore, the larger the score difference between the first and second candidates, the more accurate the judgment can be considered. In FIG. 9, for any character, a larger score difference is calculated from the gray scale image produced by applying such a volume of light as to maximize the inter-class variance than from the grayscale image produced by applying a volume of light optimized by Sobel filter-based search. This indicates that the value of inter-class variance can be used as an appropriate index for determining what volume of light should be applied in order to produce a grayscale image of the identifier to be recognized.

Setting of Other Parameters Having Influence on Contrast

Although it is assumed so far that only one parameter, light volume, is optimized in the present invention, other parameters such as wavelength and irradiation angle have influence on the contrast as well. The present embodiment can also be used to optimize a plurality of parameters. In this case, one parameter is at first optimized based on the value of inter-class variance while the other parameters are fixed. Then, another parameter is optimized likewise while the other parameters are fixed. By repeating this process, all parameters can be converged to optimum values.

The light source parameter determining method of the present embodiment is suitable in a case where the brightness of the background does not change monotonously due to the flatness when the parameter of the light source is changed and the identifier causes diffused reflection due to its irregular surface. The method is also suitable in an opposite case where the background has irregularities and the identifier has a flat surface. The same principle is effective to both cases in producing an optical image whose contrast is optimized for separation of the object from the background. Thus, the light source parameter determining method of the present embodiment is suitable for obtaining good contrast optical images of identifiers which are formed on mirror-finished flat semiconductor, metal, ceramic and other surfaces by laser beam irradiation, stamping, etching, die working, press working, etc.

The present invention is applicable to a wide range of fields where good contrast images must be produced in order to recognize identification marks.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A method for setting a parameter of a light source which applies an image pickup beam to an object surface including a background and an identification mark, said method comprising:

setting a parameter of the light source which has influence on the brightness of the object surface, to a predetermined value;

generating a grayscale image from the reflection of incident light which is applied to the object surface from the light source for which said parameter has been set to the predetermined value;

a peak inter-class variance value selecting step which includes setting plural thresholds each for binarizing the grayscale image in density, calculating inter-class variance values to be produced respectively according to the plural thresholds, and selecting the largest inter-class variance value as the peak inter-class variance value from the inter-class variance values calculated;

a maximum inter-class variance value selecting step which includes changing said light source parameter to a plurality of different values, obtaining peak inter-class variance values respectively for the plurality of different values, and selecting the largest peak inter-class variance value as the maximum inter-class variance value from the peak inter-class variance values obtained; and setting said light source parameter to a value which would give the maximum inter-class variance value.

2. A light source parameter setting method according to claim 1, wherein said parameter is the light volume of the light source.

3. A light source parameter setting method according to claim 1, wherein said parameter is the wavelength of the light source.

4. A light source parameter setting method according to claim 1, wherein said parameter is the angle of the light beam applied from the light source with respect to the object surface.

5. A light source parameter setting method according to claim 1, wherein said parameter comprises a first parameter and a second parameter and said method further comprises: with a second parameter fixed to an arbitrary value, determining a first value of the first parameter which maximizes the inter-class variance value; with the first parameter fixed to the first value, determining a second value of the second parameter which maximizes the inter-class variance value; and setting the light source's first parameter and second parameter to the first value and the second value, respectively.

6. A light source parameter setting method according to claim 1, wherein the grayscale image has N-grayscales of 0 to N−1 and the peak inter-class variance value selecting step sets N thresholds of 1 to N−1 or 0 to N−2.

7. A light source parameter setting method according to claim 1, wherein in the peak inter-class variance value selecting step, each of said peak inter-class variance values V is calculated according to:

$$V = \omega_1 \omega_2 (M_1 - M_2)^2$$

where, $\omega_1$ and $M_1$ are the number and mean density value of pixels sorted into one class based on a threshold while $\omega_2$ and $M_2$ are the number and mean density value of pixels sorted into the other class based on the threshold.

8. A light source parameter setting method according to claim 1, wherein in the maximum inter-class variance value selecting step, the parameter is changed incrementally from the lowest value to the highest value.

9. A light source parameter setting method according to claim 8, wherein the parameter is the light volume of the light source and the highest light volume is set based on the occurrence of halation in the maximum inter-class variance value selecting step.

10. A light source parameter setting method according to claim 1, wherein the object surface includes a flat surface with which a metal, ceramic or semiconductor is provided.

11. A light source parameter setting method according to claim 10, wherein the identification mark is formed on the flat surface by laser beam irradiation, etching, stamping, or punching.

12. A recognition method for recognizing an identification mark on an objective surface, said method comprising:

setting the light volume of a light source to a predetermined value;

generating a grayscale image from the reflection of the set volume of incident light which is applied to the object surface from the light source;

a peak inter-class variance value selecting step which includes setting plural thresholds each for binarizing the grayscale image in density, calculating inter-class variance values to be produced respectively according to the plural thresholds, and selecting the largest inter-class variance value as the peak inter-class variance value from the inter-class variance values calculated;

a maximum inter-class variance value selecting step which includes changing the light volume to a plurality of different values, obtaining peak inter-class variance values respectively for the plurality of different values, and selecting the largest peak inter-class variance value as the maximum inter-class variance value from the peak inter-class variance values obtained; and a recognition step which includes setting the light volume of the light source to a value which would give the maximum inter-class variance value, generating a grayscale image from the reflection of the set volume of incident light, and recognizing the identification mark by comparing the identification mark in the grayscale image with standard patterns of the identification mark.

13. A recognition method according to claim 12, wherein the grayscale image has N-grayscales of 0 to N−1 and N thresholds are set in the peak inter-class variance value selecting step.

14. A recognition method according to claim 12, wherein in the maximum inter-class variance value selecting step, the light volume is changed incrementally from the lowest value to the highest value.

15. A recognition method according to claim 14, wherein the parameter is the light volume of the light source and the highest light volume is set based on the occurrence of halation in the maximum inter-class variance value selecting step.

16. A recognition method for recognizing an identification mark formed on a surface of a head/slider for use in a magnetic disk drive, said method comprising:

setting the light volume of a light source to a predetermined value;

a grayscale image generating step which includes generating a grayscale image from the reflection of the set volume of incident light which is applied to the head/slider surface from the light source;

a peak inter-class variance value selecting step which includes setting plural thresholds each for binarizing the grayscale image in density, calculating inter-class variance values to be produced respectively according to the plural thresholds, and selecting the largest inter-class variance value as the peak inter-class variance value from the inter-class variance values calculated;

a maximum inter-class variance value selecting step which includes changing the light volume to a plurality of different values, obtaining peak inter-class variance values respectively for the plurality of different values by executing the grayscale image generating step and the peak inter-class variance value selecting step for each of the different values, and selecting the largest peak inter-class variance value as the maximum inter-class variance value from the peak inter-class variance values obtained; and a recognition step which includes setting the light volume of the light source to a value which would give the maximum inter-class variance value, of generating a grayscale image from the reflection of the set volume of incident light, and recognizing the identification mark by comparing the identification mark in the grayscale image with standard patterns of the identification mark.

17. A recognition method according to claim 16, wherein the head/slider is structured as a head gimbal assembly for the magnetic disk drive.

18. A recognition method according to claim 16, wherein the identification mark is formed on a side surface on the leading edge of the head/slider.

19. A recognition method according to claim 16, wherein the identification mark is formed by laser beam irradiation.

20. A recognition method according to claim 16, wherein the grayscale image has N-grayscales of 0 to N−1 and N thresholds are set in the peak inter-class variance value selecting step.

* * * * *